March 3, 1936.  S. C. LYONS  2,032,624
PROCESSING OF MOIST PLASTIC BODIES
Filed Nov. 28, 1934
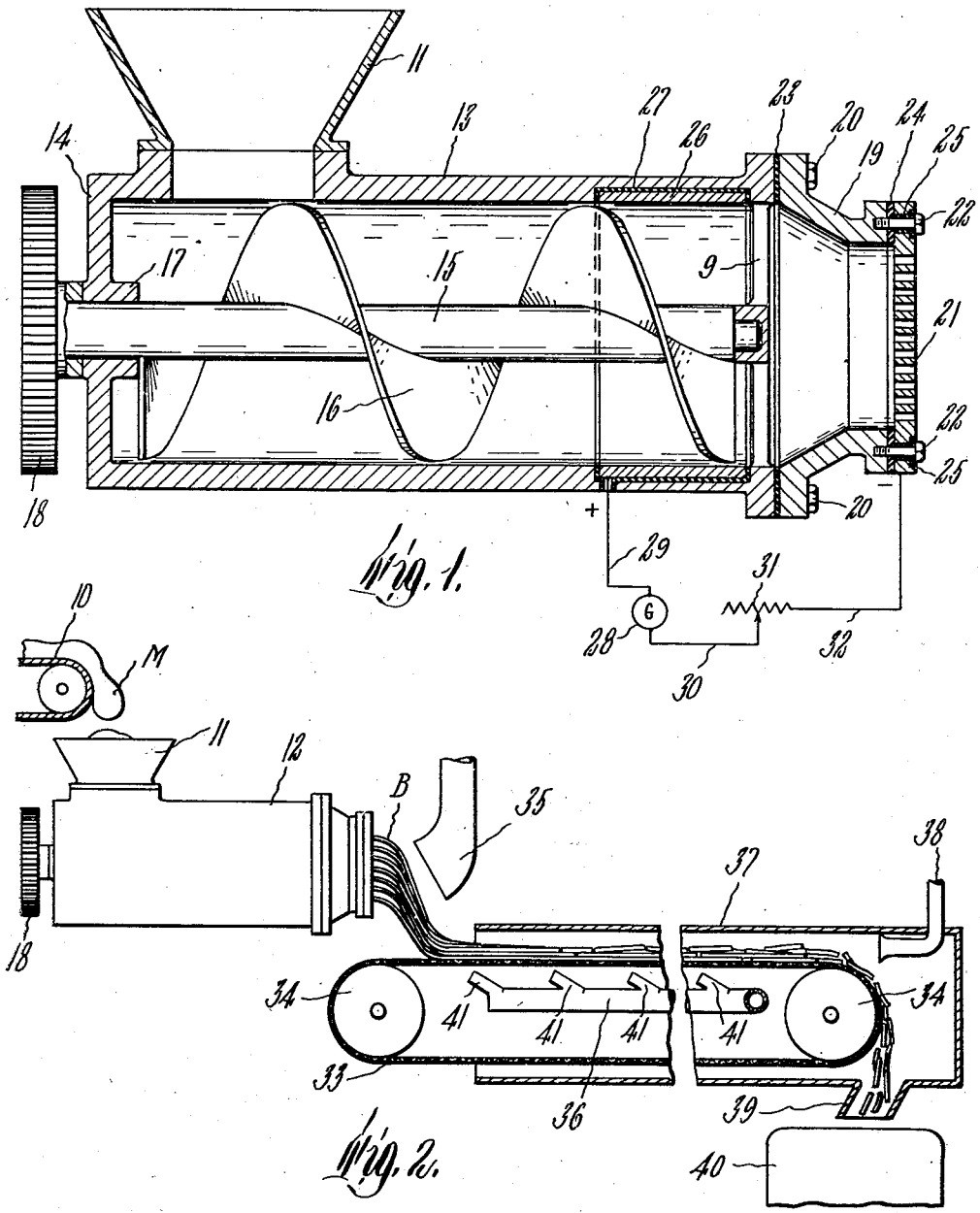
Inventor
Sanford C. Lyons Patented Mar. 3, 1936

2,032,624

UNITED STATES PATENT OFFICE 2,032,624

PROCESSING OF MOIST PLASTIC BODIES

Sanford C. Lyons, Bennington, Vt., assignor to Bird Machine Co., Walpole, Mass., a corporation of Massachusetts Application November 28, 1934, Serial No. 755,191

6 Claims. (Cl. 204—1)

The subject of this invention is, broadly stated, the processing of moist, plastic bodies and more particularly processing designed to put such bodies in physical form such that they can be subjected advantageously to drying, crushing, or other mechanical or chemical treatments. While not restricted thereto, the present invention devolves about the processing of moist, plastic clay such as is produced as a step product at clay quarries, in consequence of having put freshly quarried clay through such operations as suspension in water to form a slurry, removing sand, mica, and other relatively coarse impurities from the slurry, as by riffling, settling, or centrifugation, and separating and recovering the clay solids from most of the water of the slurry, as in filter presses, settling vats, or electrophoretic centrifuges of the type disclosed in my application Serial No. 744,759, filed September 20, 1934.

A moist, plastic clay mass produced in the foregoing manner will vary in its consistency from loose paste to stiff putty, depending upon the particular moisture content possessed thereby and also upon the nature of the clay, that is, its content of extremely fine or colloidal clay particles. The pH value of the mass also determines in some measure its consistency, a pH value on the acid side bespeaking a stiffer consistency for a particular moisture content than a pH value on the alkaline side. Before being marketed, it is necessary to dewater the clay mass practically to completion, for instance, to a free moisture content of only a few percent, so that it may be shipped economically and be put to immediate use by the consumer for those purposes requiring substantially complete dryness thereof. A moist, plastic clay mass presents a serious drying problem, for, by reason of its stickiness, it cannot be conveniently handled and, by reason of its compactness and colloidal character, it cannot be dried quickly and/or substantially uniformly unless reduced to comparatively small and uniform aggregates. It has been proposed to condition the moist, plastic clay mass for drying by extruding it as elongated bodies of comparatively small, substantially uniform cross-sectional area, as such bodies lend themselves to comparatively easy handling and to comparatively rapid and substantially uniform drying. The extrusion of the moist, plastic clay mass can be effected through a multiple-apertured plate or die member, but, when extrusion is done with the mass at comparatively low moisture content, for instance, at a moisture content in the region of about 20% to 25%, it is found that the apertures of the plate or die member tend to become fouled or clogged with the clay so as to raise the power required for the extrusion of a given amount of clay. It is thus seen that unless the extruding machine is cleaned at frequent intervals, it will not continue to function at its rated capacity. While it is possible to obviate fouling or clogging of the extruding machine by working with a clay mass of sufficiently high moisture content, nevertheless, this is undesirable because of the extra load put on the drying equipment and the attendant excessive drying costs. It might be observed that fouling or clogging of the extruding machine and/or excessive power consumption is encountered especially when extrusion is effected through apertures or orifices of small cross-sectional area, such as are highly desirable from the standpoint of realizing best results in the drying operation, for instance, when extrusion of the mass is effected through circular apertures of a diameter in the order of magnitude of about $\tfrac{3}{32}$ inch, which size of aperture is highly desirable insofar as concerns the realization of elongated bodies that can be conveniently handled and substantially uniformly and quickly dried. It is found that fouling or clogging of apertures of such size takes place with disconcerting frequency, especially when the mass is of a free moisture content not exceeding about 25% of its weight in the case of the kaolins quarried at Bennington, Vermont. Clays quarried in other regions may result in the clogging of apertures of such size even when they have higher moisture contents, especially if they are on the acid side and/or are of highly colloidal character.

In accordance with the present invention, moist, plastic clay masses of the character described are conditioned for drying and/or other treatments by extrusion through a multiple-apertured plate or die member while such plate or die member is under an electro-negative charge relative to the mass, and another part of the extruding machine, preferably that close to the plate or die member, is under an electro-positive charge relative to the mass and the mass itself is subject to electro-tension as it is being extruded through such plate or die member, for I have found that under such conditions it is possible to prevent fouling or clogging of the apertures when the mass is at 20% or even lower free moisture content. In practical operation, however, it is necessary only to provide against the clogging of the apertures when the mass has a free moisture content not less than about 20%, since this is usually the lowest free moisture content to which the mass is brought by filter presses, settling vats, electrophoretic centrifuges, or other partial dewatering equipment with which I am familiar. By applying the principles of my invention, it becomes possible to extrude the moist, plastic clay mass through apertures of the smallest desired cross-sectional area, for instance, through circular apertures of a diameter in the order of magnitude of $\frac{1}{32}$ inch, while at the same time obviating fouling or clogging of such apertures and/or excessive power consumption even when the mass is being extruded at the lowest or optimum free moisture contents. Once extrusion of the mass has been effected, the extruded elongated bodies of small, substantially uniform cross-sectional area may be dried in any suitable way, preferably by transfer directly from the extruding machine onto an endless carrier or conveyor on which drying of the bodies may be progressively effected by currents of hot air suitably brought to play on the bodies. The dried clay bodies may be shipped as such to the consumer, although, in some cases, it is preferable to deliver them directly from the endless carrier on which their drying has been effected into suitable crushing or pulverizing equipment, for instance, into a hammermill, which reduces them to a pulverulent condition. Thus, when the clay is intended for use in dry, pulverulent condition, as in the compounding of rubber, it is preferable that the dried bodies be reduced to pulverulent condition preparatory to shipment so that the clay may reach the consumer ready for use.

With the foregoing and other features and objects in view, the present invention will now be described in further detail with particular reference to the accompanying drawing wherein,—

Figure 1 represents a section through an extruding machine for practicing my invention.

Figure 2 illustrates diagrammatically and conventionally instrumentalities that may be employed in my process as a whole, beginning with the moist, plastic clay mass and ending with a dry, pulverulent product.

As shown in Figure 2, the moist, plastic clay mass M may be progressively delivered by a suitable conveyor 10 to a hopper 11 forming part of an extruding machine indicated generally at 12. The mass M may come directly from the filter presses, settling vats, electrophoretic centrifuges, or other equipment that effects a removal of most of the water present in the purified clay slurry to which reference has already been made. As previously indicated, the mass may have a moisture content ranging from about 20% to 40%. Pursuant to the present invention, it is preferable to supply the extruding machine with a mass of a moisture content ranging from about 20% to 25%. Such a mass is of a stiff putty-like consistency and tends to fall into the hopper of the extruding machine as large gobs or lumps of variant sizes and shapes. The extruding machine, as shown in Figure 1, includes a cylindrical casing 13 which receives the clay mass from the hopper 11 arranged above the upper wall and near the rear end closure 14 thereof. Extending axially through the casing is a shaft 15 of a feed worm or screw blade 16 which serves to propel the clay mass under considerable pressure from the rear to the front or discharge end of the casing. The shaft 15 is shown passing through a journal 17 forming part of the closure 14 and terminating as a gear 18 which may be driven by an electric motor or by any other suitable source of power. The screw blade 16 preferably barely clears the internal wall of the casing so that very little, if any, plastic clay slips past the moving blade and so that highly efficient electro-osmotic action, presently to be described, can be effected on the clay mass immediately before it is extruded. The front end of the shaft 15 is preferably journaled for rotation in a stationary spider 9 arranged at the front end of the casing. The discharge end portion of the casing may be defined by a tapered annular member or throat 19 secured, as by bolts 20, to the front end of the casing proper 13. The member 19 is equipped at its outer or small diameter end with a removable perforated discharge plate or multiple-apertured die member 21, which may be secured thereto, as by bolts 22. The discharge openings or perforations in the plate 21, which are preferably of uniformly small size, may assume any suitable cross-sectional shape, for instance, circular, triangular, rectangular, or other regular shape. Assuming that circular discharge openings are employed, they may be of a diameter of about $\frac{1}{32}$ to $\frac{3}{8}$ inch. The opposed surfaces of the casing 13 and the annular member 19 are preferably kept in leak-proof engagement by a gasket 23.

In accordance with the present invention, the discharge plate 21 is impressed with an electro-negative charge of sufficient intensity to induce electro-osmosis of water from the clay mass being extruded to the surfaces presented by the plate, including the surfaces defining the discharge openings, thereby resulting in the deposition and accretion of sufficient water on such surfaces to serve as a lubricant and thus facilitate extrusion of the mass. Again, the cathodic action afforded by the discharge plate serves to engender alkalinity in the moisture attracted to the plate surfaces, which alkalinity is accompanied by increased fluidity of the clay mass adjacent to the plate surfaces, including the surfaces defining the discharge openings, for, as already indicated, alkalinity in the clay mass makes for greater fluidity thereof, probably as a result of deflocculation of clay aggregates. In order to realize the desired electro-negative charge on the discharge plate, it must be electro-insulated from the rest of the extruding machine. To this end an electro-insulating gasket 24 may be placed between the opposed surfaces of the annular member 19 and the discharge plate 21 and electro-insulating sleeves 25 may encompass the shanks of the bolts 22 so as to keep them out of electrical contact with the plate.

Any suitable part of the extruding machine making direct contact with the clay mass may be put under the electro-positive charge necessary to close the electro-osmotic circuit to which the clay mass is subjected and to keep the discharge plate 21 under the desired electro-negative charge necessary for developing the desired water-lubrication of its surfaces. Preferably only that part of the extruding machine or casing near the discharge plate 21 is put under the electro-positive charge so as to concentrate the electrical energy being consumed largely on that portion of the clay mass about to undergo extrusion and so as to minimize the voltage or electro-potential necessary to develop the desired water-lubrication of the surfaces of the discharge plate. As shown in Figure 1, the casing 13 includes a tubular electrode 26 fitted into an annular recess at its front end portion, the internal surface of the electrode being substantially flush with the internal surface of the rest of the casing. The electrode 26 may be insulated from the material of the casing 13 by suitable electro-insulating material 27. It is preferably of a material resistant to electrolytic disintegration, that is, to disintegration by chemical and/or electro-chemical reactions ensuing thereat. Such material as hard lead is especially adapted therefor on account of its comparative non-corrodibility when used as an anode. As already stated, the worm blade 16 barely clears the internal wall of the casing 13, including the internal wall of the electrode 26, wherefore, the internal wall of such electrode is substantially constantly being substantially completely freed over comparatively large areas thereof from thick layers of clay, which, if permitted to remain static thereon, would tend to cut down seriously its effectiveness as an anode. In this connection, it might be observed that clay particles tend to adhere firmly, because of electrophoretic attraction, to the anode and that a layer of considerable thickness would tend to deposit on the anode and detract markedly from its effectiveness, unless provision were made, as hereinbefore described, to free the anode substantially completely from adherent clay solids. It might further be noted that when a layer of considerable thickness is permitted to deposit on the anode, that portion of the layer immediately next to the anode tends to become dehydrated or baked onto the anode. Such dehydrated portion is of extremely low electro-conductivity and results in undesirable localized heating of the clay mass as well as localized voltage drop across such portion with a resulting greatly decreased water-deposition by electro-osmosis on the surfaces of the discharge plate where such water-deposition is desired.

In order to avoid diversion of electric current through the tapered annular member or throat 19 as well as to avoid rendering it an anodic electrode in its action on the clay mass, it may be desirable to line the internal surface of such member with rubber or other electro-insulating material so as to minimize such action. As indicated in Figure 1, the electric current necessary for maintaining the desired electro-osmotic action on the clay mass may be supplied from a direct current generator 28 whose positive pole leads by way of the wire 29 to the electrode 26 and whose negative pole leads by way of the wire 30, a variable rheostat 31, and a wire 32 to the discharge plate 21.

It is possible to employ various voltages in realizing through electro-osmosis the desired water-lubrication of the surfaces of the discharge plate 21, a voltage of as low as 20 yielding significant lubricating effect. One need not go to excessively high voltages to realize all the water-lubricating effect desired on the surfaces of the discharge plate, voltages ranging from about 50 to 220 being adequate for this purpose. Indeed, experimentation has shown that generally one need not go to above 120 volts in attaining highly satisfactory commercial operation of the extruding machine.

As illustrated in Figure 2, the elongated clay bodies B of small, substantially uniform cross-sectional area may be discharged from the extruding machine directly onto the upper stretch of an endlessly moving carrier 33 on which their drying may be effected. The carrier 33 is preferably wire cloth or other flexible foraminous material which moves about terminal rolls 34, either one of which may be caused to rotate by suitable means (not shown) so as to produce the desired endless movement of the carrier. A current of hot air is preferably directed with substantial uniformity over the multitudinous surfaces presented by the bodies B immediately before they drop onto the rear or receiving end portion of the upper carrier stretch, such current of hot air coming from a suitable nozzle 35 supplied with such air under suitable pressure by a fan or blower (not shown). The hot air with which the bodies contact immediately after their extrusion serves to dry out their surfaces sufficiently to destroy their tackiness and thus to prevent them from sticking together and amalgamating into undesirably large masses presenting the drying problem already mentioned. The surface-dried bodies are thus transferred to the carrier as substantially individual units or entities and are subjected to further drying action thereon. As further drying thereof takes place, they tend to shrink markedly and, by reason of the shrinking stresses exerted thereon, to break up into comparatively short lengths or fragments which maintain their individuality. Drying of the bodies may be accomplished as by blowing hot air upwardly through the upper stretch of the carrier into contact therewith from a series of nozzles 41 projecting from a manifold 36 arranged immediately below the upper stretch of the carrier. It is preferable that the carrier travel through a housing or tunnel 37 which serves to maintain a substantially uniformly heated atmosphere about the clay bodies and to prevent dissipation of the hot air before it has exhausted considerable or most of its drying capacity. The desired uniformity of heating atmosphere about the clay bodies may be further fostered by sweeping their upper surfaces with a current of hot air flowing therepast in counter-current flow to the movement of the carrier and emitted from a nozzle 38 near the discharge end of the carrier. The length of the drying stretch of the carrier 33, the temperature of the hot air supplied as the drying medium, the rate of travel of the carrier, and the other factors affecting the drying action on the clay bodies may be so coordinated that the bodies are substantially completely dried as they are being discharged from the carrier. As appears in Figure 2, when the carrier makes the turn about the discharge terminal roll 34, the substantially completely dried bodies leave the carrier and fall into a chute 39 which directs them into the intake 40 of a hammermill or other crushing or disintegrating machine, whence they may be taken in the crumbled or pulverulent form desired for shipment. When the dried clay is to be put to uses requiring redispersion in water, it is, however, unnecessary to disintegrate the bodies as delivered by the dryer. On the contrary, they may to advantage be shipped to the consumer in the very same physical form as delivered by the dryer.

It will be appreciated that while I have hereinbefore described the practice of my invention as performed in an extruding machine of a particular construction, such inventive practice may be performed with machines otherwise constructed, for instance, machines equipped with pistons or other pressure elements capable of effecting an extrusion of a moist, plastic clay mass. It should also be understood that the anode of the extruding machine may assume various forms, depending upon the particular construction of machine wherein it is employed, and that it may occupy a position relative to the cathodic discharge plate other than that of the particular machine hereinbefore described.

The principles of the present invention may be extended to the treatment of various kinds of moist, plastic bodies lending themselves to extrusion and exhibiting electro-osmosis. Thus, they are applicable to moist, plastic masses of fossil earth or so-called kieselguhr, various inorganic pigments, such as lithopone, cement-forming mixtures, and other inorganic or organic bodies to undergo drying, clinkering, or other treatment of a mechanical or chemical nature that can be performed to best advantage on elongated bodies of small, substantially uniform cross-sectional area rather than upon large masses of widely variant sizes and shapes.

I claim:

1. In the extrusion of a moist, plastic mass containing fine solids tending to deposit on a positive electrode, as elongated bodies of small cross-sectional area through an extruding machine equipped with a perforated discharge plate, that practice which involves impressing the discharge plate with an electro-negative charge and another part of the machine contacting with the mass with an electro-positive charge under conditions to attract moisture by electro-osmosis to the surfaces of the plate, thereby maintaining such surfaces lubricated as the mass is being extruded, and substantially constantly freeing said positively charged part of the machine substantially completely from said solids tending to become deposited thereon by electrophoretic attraction.

2. In the extrusion of a moist, plastic mass containing fine solids tending to deposit on a positive electrode, as elongated bodies of small cross-sectional area through an extruding machine equipped with a perforated discharge plate, that practice which involves impressing the discharge plate with an electro-negative charge and another part of the machine with an electro-positive charge under conditions to attract moisture by electro-osmosis to the surfaces of the plate and to concentrate the electro-osmotic current largely upon that portion of the mass about to be extruded, thereby maintaining such surfaces lubricated as the mass is being extruded, and substantially constantly freeing said positively charged part of the machine substantially completely from said solids tending to become deposited thereon by electrophoretic attraction.

3. In the extrusion of a moist, plastic clay mass containing fine solids tending to deposit on a positive electrode, as elongated bodies of small cross-sectional area through an extruding machine equipped with a perforated discharge plate, that practice which involves feeding such mass to the machine at a free moisture content of about 20% to 40%, impressing the discharge plate with an electro-negative charge and an adjacent part of the machine contacting with such mass with an electro-positive charge so as to concentrate upon that portion of the mass about to be extruded an electro-osmotic current of sufficient intensity to attract moisture to the surfaces of the plate, thereby maintaining such surfaces lubricated as the mass is being extruded, and substantially constantly freeing said positively charged part of the machine substantially completely from said solids tending to become deposited thereon by electrophoretic attraction.

4. A machine for extruding a moist, plastic mass containing fine solids tending to deposit on a positive electrode, as bodies of small cross-sectional area, comprising in combination a casing into which such mass may be delivered, said casing including a multiple-apertured discharge plate through which said mass may be extruded, said plate being electro-insulated from the rest of the machine, means for applying pressure to said mass in said casing to effect its extrusion through said plate, means for impressing an electro-negative charge on said plate and an electro-positive charge on another part of the machine as the mass is being extruded, and means for substantially constantly freeing said positively charged part of the machine substantially completely from said solids tending to become deposited thereon by electrophoretic attraction.

5. A machine for extruding a moist, plastic mass containing fine solids tending to deposit on a positive electrode, as bodies of small cross-sectional area, comprising in combination a casing into which said mass may be delivered, said casing including a multiple-apertured discharge plate through which said mass may be extruded and an electrode adjacent to said plate with which said mass contacts on its way to said plate, said plate and electrode each being electro-insulated from each other and from the rest of the machine, means for applying pressure to said mass in said casing to effect its extrusion through said plate, means for impressing an electro-negative charge on said plate and an electro-positive charge on said electrode as the mass is being extruded, and means for substantially constantly freeing said positively charged electrode substantially completely from said solids tending to become deposited thereon by electrophoretic attraction.

6. A machine for extruding a moist, plastic mass containing fine solids tending to deposit on a positive electrode, as bodies of small cross-sectional area, comprising in combination a generally cylindrical casing into which said mass may be delivered; said casing including a multiple-apertured discharge plate through which said mass may be extruded, a tapered annular discharge throat to whose discharge end said plate is secured, and an annular electrode adjacent to the inner end of said throat with which said mass contacts on its way to said throat and said plate; said plate and electrode each being electro-insulated from said throat and from the rest of the machine; means for applying pressure to said mass in said casing to effect its extrusion through said plate; means for impressing an electro-negative charge on said plate and an electro-positive charge on said electrode as the mass is being extruded; and means for substantially constantly freeing said positively charged electrode substantially completely from said solids tending to become deposited thereon by electrophoretic attraction.

SANFORD C. LYONS.